United States Patent [19]
Van Cleef et al.

[11] Patent Number: 5,716,723
[45] Date of Patent: Feb. 10, 1998

[54] GLOW IN THE DARK SHOE SOLE

[76] Inventors: James Gresham Van Cleef, 66 Maple Ave., Fair Haven, N.J. 07704; Dennis Ryan, 23 Sailers Way, Rumson, N.J. 07760; Chang Sik An, #75-241, Dea Chung Dong, Jung-Ku; Chung Yeon Park, #625-1, Dukpo Dong, Sasan-Ku, both of Pusan, Rep. of Korea

[21] Appl. No.: 612,773

[22] Filed: Mar. 7, 1996

[51] Int. Cl.$^6$ .................................................. C09K 11/02
[52] U.S. Cl. ........................ 428/690; 428/34.1; 36/25 R; 36/32 R
[58] Field of Search .................. 36/25 R; 428/32 R, 428/34.1, 690

[56] References Cited

U.S. PATENT DOCUMENTS 4,629,583  12/1986  Goguen ........................ 252/301.35

Primary Examiner—Charles Nold
Attorney, Agent, or Firm—Ward & Olivo

[57] ABSTRACT

This invention relates to phosphorescent, polymer-containing compositions for use in Glow In The Dark shoe soles, and other molded or extruded shoe parts made from such compositions. One aspect of this invention is directed to a polymeric composition comprising between about 40–50% by weight rubber; 5–10% by weight processing oil; 0–5% by weight stabilizer; and 3–8% by weight phosphorescent material. A sole made according to the present invention for a children's athletic shoe comprises a mass of sole-forming phosphorescent material having peripheral edges and a cushioning element. The 'Glow In The Dark' portion of the shoe being visible on both the peripheral edges and underneath surface.

18 Claims, 3 Drawing Sheets

GLOW IN THE DARK SHOE SOLE

BACKGROUND OF THE INVENTION

The present invention relates to athletic shoes, and in particular, to an athletic shoe comprising a 'glow in the dark' sole. Phosphorescence enables the wearers of shoes made from, or having soles made from, the compositions of the present invention to be easily identified at night. Such shoes find particular use by pedestrians and bicyclists. In addition, children are intrigued by the glow in the dark feature of the sole and are inclined to wear these types of shoes more than plain shoes and tend to learn how to put them on faster. Further, glow in the dark soles enable a person to locate their shoes quickly and easily at night.

Phosphorescent materials have been used in a variety of commercial applications because they have the property of continuing to emit light for an extended period of time after excitation. Phosphorescent pigments have, therefore, been used in warning signs; marking of vital machinery; dial illumination; directional signs on walls of underground stations, garages, hallways; and applied to helmets as used in fire departments, accident prevention, etc. Phosphorescent pigments have also found application for use on protective clothing, sports equipment and a variety of toys where the effect of glowing in the dark provides amusement, ornamental and/or safety features. Phosphorescent materials include a phosphor which has been artificially prepared and has the property of luminescence when activated by appropriate wavelengths of light. A variety of phosphors are available for use in providing luminescence when activated by an appropriate source of light. Commercially available phosphors include zinc sulfide, zinc cadmium sulfide, alkaline earth sulfides with or without a trace of activators, such as silver, copper or manganese to provide the desired rapid activation of the phosphorescent material in providing the luminescent image. The phosphorescent pigments may be incorporated into a variety of carriers so that the phosphorescent material may be used in many ways such as forming heat transfers to fabric surfaces for purposes of ornamentation.

The phosphors, which are used as phosphorescent pigments in a carrier to form the phosphorescent material sheet, can be incorporated with a variety of carriers. Commercially available sheets of phosphorescent material include the admixture of phosphorescent pigment with clear polyvinylchloride which is extruded in sheet form. The concentration of the phosphorescent pigment is essentially uniform across at least the upper surface of the sheet. This ensures an even degree of illumination across the surface of the activated phosphorescent material.

"Graying" can occur should the phosphorescent pigments of the material be exposed to direct ultraviolet light and high humidity conditions for a long period of time. This is particularly applicable with zinc sulfides and zinc cadmium sulfides.

In some situations, an intense luminescent image is desired which may require high concentrations of phosphor in the phosphorescent material in the range of 20 to 30%. This can result in the luminescent image remaining for a considerable length of time before the image decays to a level of luminescence which is imperceptible to the human eye in normal dark environments. It has been found that exposing the phosphorescent material to electromagnetic radiation having a wavelength in the range of infrared to red light causes a very rapid deactivation of the phosphorescent material to return substantially to a deactivated state and permit immediate reuse of the device.

Phosphorescence is provided by the addition of a small percentage of a particulate metal sulfide, preferably zinc sulfide containing a minor portion of copper sulfide. Other sulfides such as cadmium are used to vary the color of the phosphorescence.

The phosphorescent pigments used in this invention are metal sulfides which have the ability to quickly absorb light and then emit the light in a colored glow over a period of time. Zinc sulfide is typically used in a proportion with 20 to 50 parts per million of copper sulfide. Zinc sulfide glows a green color after exposure to white light. A mixture of 50% zinc sulfide and 50% cadmium sulfide with the copper activator glows an orange-red color, but is not quite as brilliant as the zinc sulfide glow.

Phosphorescent particles from 20 to 100 microns have been tested and compared as to their efficiency. No noticeable difference was observed in the glow using the same weight percentage over this size range. One advantage in using the small particle sizes is that they remain in suspension better during manufacture. The density of the phosphorescent particles is very high and care must be taken to maintain a homogeneous distribution of them during mixing and packaging.

The phosphorescent particles are not soluble in the water-based compositions and lack any significant coloring in daylight. Coloring agents, therefore, must be added to the gel composition to obtain a desired variety of colors for the product. Some colors are very detrimental to the glow from the phosphorescent particles because the color tends to shield the particles from both absorption and emission of light. Dark colors provide too much shielding of the particles and, therefore, a more pastel color assortment is desired.

The modern shoe, particularly an athletic shoe, is a combination of many elements which have specific functions, all of which must work together for the support and protection of the foot. The design of an athletic shoe has become a highly refined science. Athletic shoes today are varied in both design and purpose. Tennis shoes, basketball shoes, running shoes, walking shoes, etc., are all designed to provide a unique and specific combination of traction, support, and protection to enhance performance. Not only are shoes designed for specific sports, they are also designed to meet the specific characteristics of the user. For example, shoes are designed differently for heavier persons than for lighter persons; differently for wide feet than for narrow feet; differently for high arches than for low arches, etc. Some shoes are designed to correct physical problems, such as over-pronation, while others include devices, such as ankle supports, to prevent physical problems from developing. Other shoes are designed to provide added safety measures, such as a luminescent quality to make them visible in the dark. Prior art describes luminaire-provided footwear, but such prior art luminescent features tend to be cumbersomely located, uncomfortable to the wearer, and difficult to repair or replace. Other prior art describes phosphorescent elastomeric material for use with footwear, but such prior art does not adequately provide sufficient durability or luminescence, or such phosphorescent material is located on the upper part of the shoe, not as a part of the sole.

Generally, a shoe is divided into two parts, an upper and a sole. The upper is designed to snugly and comfortably enclose the foot. The sole is designed to withstand many miles of running and walking while also providing support and comfort to the individual wearing the shoes. To satisfy these goals the sole is generally comprised of three layers, an inner sole, a midsole, and an outer sole. The inner sole provides a comfortable, form-fitting surface for the foot and serves as a transitional layer between the foot and the remainder of the sole. The outer sole must have an extremely durable bottom surface providing good traction when in contact with the ground. However, since such contact may be made with considerable force, protection of the foot and leg demands that the sole also perform a shock-absorbing function. Therefore, the midsole usually comprises a resilient, energy-absorbent material to serve this shock-absorbing purpose. This is particularly true for children's shoes designed to be used by the most active children on all types of surfaces.

Conventionally, it has been attempted that sneakers or sports shoes used as jogging shoes, basketball shoes, tennis shoes or the like are constructed into a multi-layer structure by forming an outer sole, which is a lowermost layer of a shoe sole contacted with the ground or a floor, made of a solid rubber material or a high-density sponge material and laminating at least one sponge sheet of a light-weight material exhibiting satisfactory cushioning properties such as ethylene vinyl acetate (EVA) on the outer sole, to thereby accomplish a decrease in weight and an improvement in shock absorbing properties. The solid rubber or high-density sponge is relatively rigid and exhibits satisfactory ground gripping properties and wear-resistant properties; however, it is increased in weight, and thereby fails to reduce the weight of the shoes.

In view of such a problem, various kinds of techniques of forming a satisfactory shoe sole while improving a material for the shoe sole have been proposed. For example, there is a method wherein a polyurethane resin film like a nonwoven sheet and a liquid polyurethane compound for forming non-slip projections are put in a mold and then subjected to thermal cure, resulting in being integrally bonded. That method is disclosed in Japanese Patent Application Laid-Open Publication No. 310601/1989. Another method comprises the steps of arranging a perforated plate on a non-woven fabric material to keep both intimately contacted with each other, pouring a polyurethane elastomer material containing a thickening agent into the perforated plate, carrying out a squeezing treatment with respect to the elastomer and heating the elastomer to cure it, resulting in forming an embossed sheet. The method is entitled a "method for manufacturing an embossed sheet" and is disclosed in Japanese Patent Application Laid-Open Publication Unfortunately, an improvement in the material for the shoe sole taught in those methods is insufficient to provide the shoe sole with satisfactory non-slip properties. In order to permit the shoe sole to exhibit increased non-slip properties, it is further required to consider other factors in addition to the material for the shoe sole, such as, for example, a height of a rugged pattern formed on the sole of the sports shoes, an area of the rugged pattern contacted with the ground, a configuration of a surface of the rugged pattern contacted with the ground, arrangement of the pattern and the like. However, consideration of the factors causes a configuration of the rugged pattern to be complicated. Therefore, manufacturing of the shoe sole with the rugged pattern of such a complicated configuration by means of a mold as proposed in Japanese Patent Application Laid-Open Publication No. 310601/1988 causes a manufacturing cost of the mold to be extensively increased.

Also, the above-described method proposed in Japanese Patent Application Laid-Open Publication No. 185922/1992 by the assignee wherein a rugged pattern is formed by the single perforated plate is conveniently applied when a configuration of the rugged pattern is relatively simple, however, it is not suitable for the rugged pattern of such a complicated configuration as described above.

Further, a rugged pattern formed on a sole of sports shoes is generally made of the same material as the sole in a manner to be integral with the sole. It is often desired to locally vary properties of the rugged pattern in order to enhance the non-slip properties and aesthetic properties of the sole. However, the above-described formation of the rugged pattern integral with the sole fails to significantly vary the properties of the rugged pattern.

Extensive clinical evaluation of foot and knee injuries sustained suggests that the most important factors associated with such injuries are shock absorption on impact and lateral foot stability. Based on injury data, these two factors appear to be of about equal importance. Therefore, both factors should be carefully considered in the design of any athletic shoes.

Registration of the upper on the sole is the final step in the manufacture of the shoe. In the shoemaking industry, "cement process" registration is an example of how shoes have been manufactured for some time with prefinished outersoles having either a molded or laminated construction. Such prefinished soles simplify the manufacturing process and introduce certain obvious economies. Their use is predicated upon the accurate registration of the prefinished sole on the upper. Present practices in the shoemaking art provide a sufficient degree of precision in the registration of the shoe components to permit full utilization of the inherent structural features of this type of shoe construction. This process provides a finished shoe which is not only light and very flexible, but also has excellent wearing qualities.

Prior art patents include U.S. Pat. No. 4,640,797 and U.S. Pat. No. 4,629,583, both to Goguen, which disclose phosphorescent polymer containing compositions suitable for use in footwear and phosphorescent shoes, shoe soles, and other molded or extruded shoe pans. A need, however, remains apparent for an improved composition which would provide a longer and brighter phosphorescent glow with an increased degree of abrasion and hardness. The present invention presents such a new and improved composition. In the past, no one has combined the important attributes of hardness, abrasion, and phosphorescence the way the applicant has.

SUMMARY OF THE INVENTION

This invention relates to footwear, and more particularly to a sole for an article of footwear. The invention has applicability to a wide range of footwear, including but not limited to athletic shoes. An object of the invention is to provide a sole for an article of footwear having greater versatility than the soles offered by prior art systems, and to provide a sole which combines the important attributes of hardness, abrasion and phosphorescence in a way which is greatly improved over anything made before.

Another aspect of this invention is directed to a composition comprising between about 40–50% by weight of a rubber substrate, preferably approximately 45.4% by weight; 5–10% by weight of a processing oil, preferably approximately 6.5%; 0–5% by weight of a stabilizer and/or preservative, preferably a mixture of stabilizers all within the same range of weights; and 3–8% by weight of a phosphorescent material, preferably approximately 6.1% by weight of Lumilux® Green phosphorescent material.

Another aspect of the present invention relates to an improved chemical composition for use in producing phosphorescent shoe soles. The present invention provides a greatly improved combination of the significant attributes of hardness, abrasion and phosphorescence.

A further aspect of the present invention relates to phosphorescent articles, in particular, shoes, shoe soles, and other shoe parts made from the above compositions, said articles having the property of glowing in the dark for a period of time following their exposure to light. The foregoing and other objects, features and advantages of this invention will be apparent from the following description of the preferred embodiments of the invention as illustrated in the accompanying drawings.

BRIEF DESCRIPTION OF THE DRAWINGS

Through example only, the invention will be described in more detail with reference to the accompanying drawings, in which.

DETAILED DESCRIPTION OF THE PREFERRED EMBODIMENT

Figure 1:
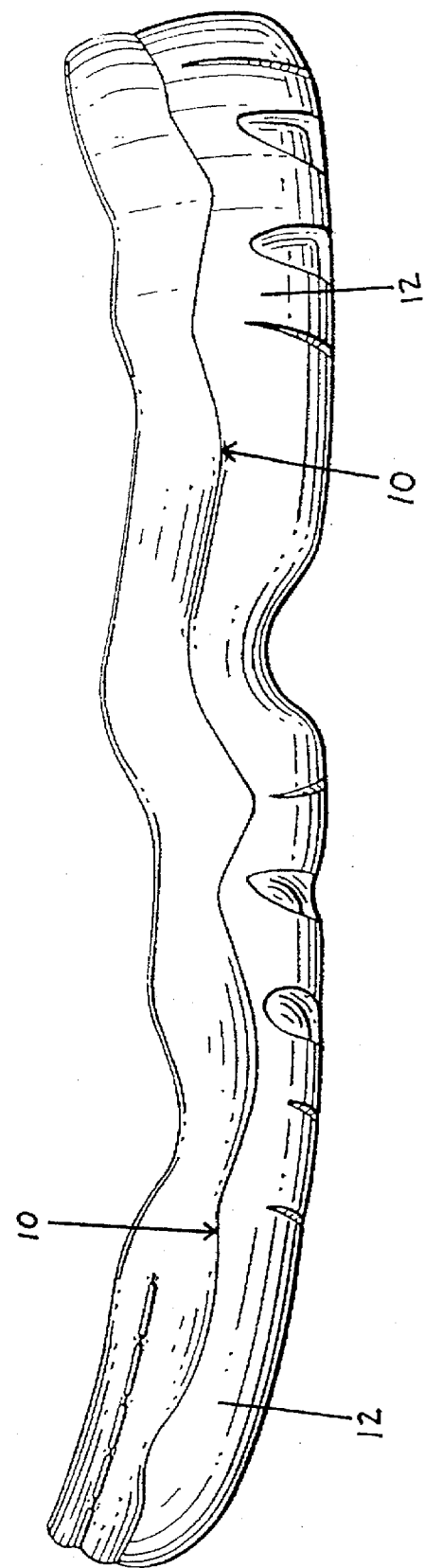
FIG. 1 is a side elevation view of a sole in accordance with the present invention.

Referring to the drawings generally, an article of footwear, such as an athletic shoe, sports shoe, or running shoe, is depicted in accordance with the present invention. Generally, the shoe comprises a sole structure or member and an upper attached thereto. The upper can be of any conventional design, while the sole structure incorporates the novel features of the present invention. The sole structure includes a force absorbing midsole and a flexible, wear resistant outsole. Of course, where appropriate, the midsole and outsole portions can be formed as a single integral unit. The midsole, and partially the outsole, comprises the cushioning element of the shoe.

As used herein, reference to the "lateral edge" refers to the outside peripheral edge of the shoe, the "medial edge" refers to the inside edge of the shoe, the "distal end" refers to that end of the shoe near the toes, and the "proximal end" refers to that end near the heel of the shoe. All components shown in the drawings are for a left shoe, the components for a right shoe being mirror images thereof. Further, it will also be noted that the various cushioning elements of this invention may be repositioned and/or used in various combinations, depending on the various activities for which the shoe is designed and/or targeted costs/selling prices.

Referring now to FIG. 1, the sole 10 comprises a resilient mass of material conforming to the shape of the lower part of an athletic shoe, or outsole 12. The material of the sole 10 is a phosphorescent polybutadiene rubber compound for making shoe soles, especially athletic shoe soles, although the applicability of the invention is not limited to athletic shoes. The outsole 12 comprises a phosphorescent or glow in the dark quality when exposed to a light source for a short period of time.

Figure 2:
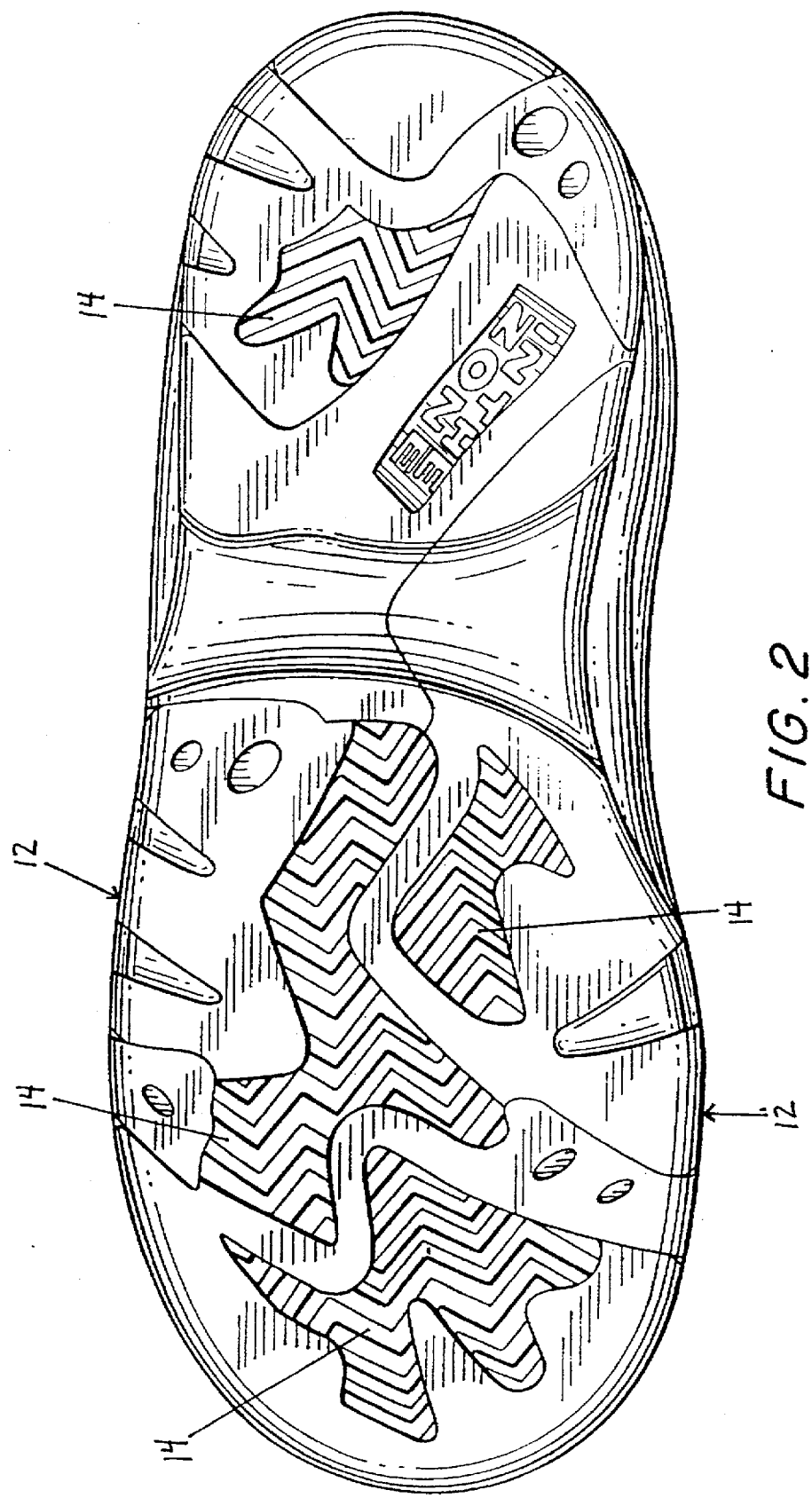
FIG. 2 is a bottom view of a sole according to the present invention.
Figure 3:
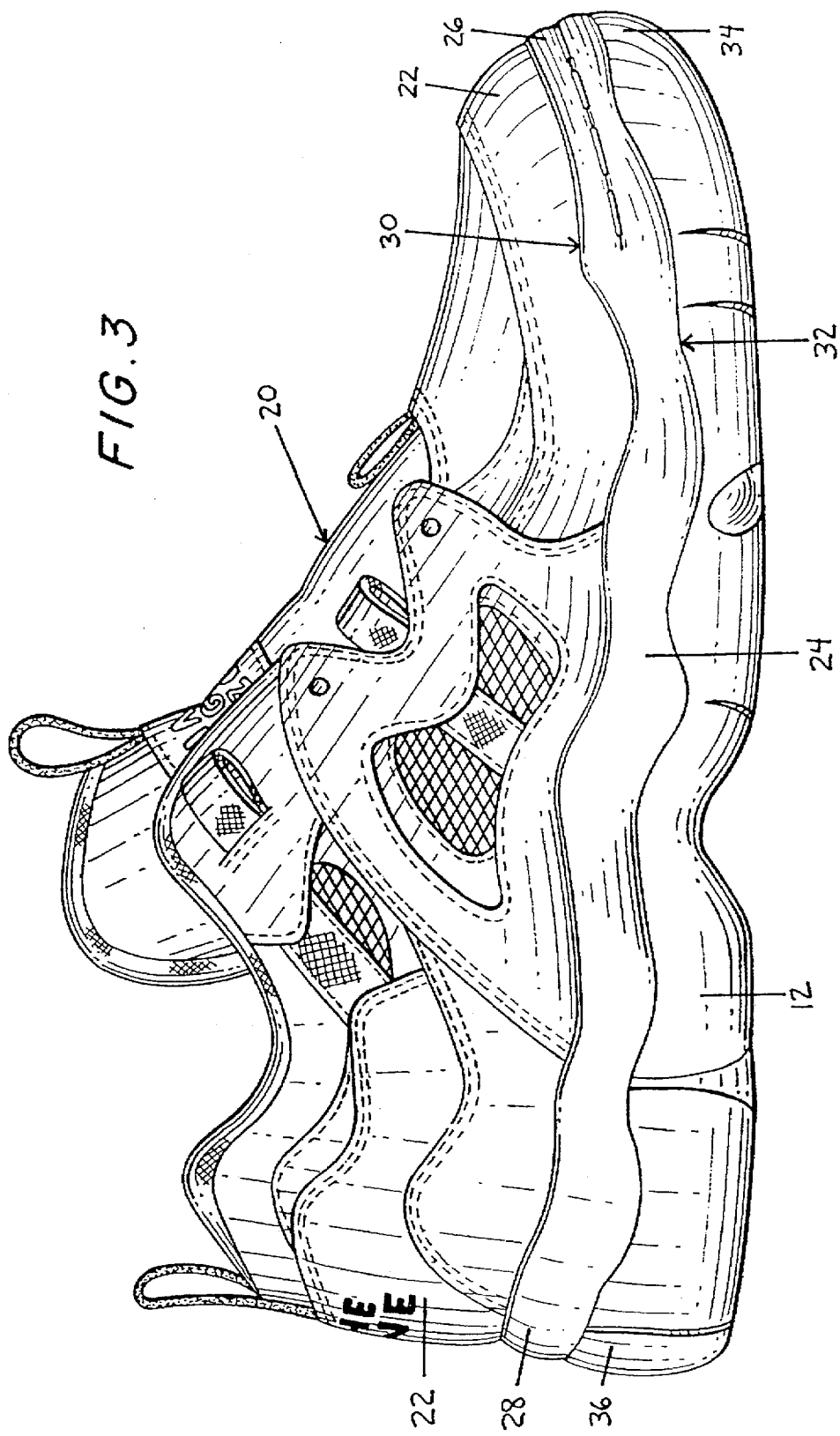
FIG. 3 is a side elevation view of an athletic shoe according to the present invention.

Referring to FIG. 2, the under surface of the outsole 12 has a conventional pattern of grooves and raised portions 14 in the surface thereof, designed for aesthetic purposes as well as for traction, support and durability. The pattern of grooves and raised portions 14 does not exhibit the phosphorescence or glow in the dark feature of the outsole 12. As may be seen in FIG. 3, the shoe 20 has an upper 22 attached to a midsole 24 which is generally formed of a foam material, has a proximal end 26, a distal end 28, a top surface 30, and a bottom surface 32, and which preferably covers the upper surfaces of the cushioning elements, as well as a major portion of the sides. The midsole 24 is attached to the outsole 12 which is preferably made of material according to the present invention. The outsole 12 has a proximal end 34, a distal end 36, a lateral edge and a medial edge. The bottom is formed into a suitable tread pattern for maximum traction, and minimal wear and tear (see FIG. 2).

The outsole 12 is attached to the bottom surface 32 of the midsole 24 via a suitable means well known in the art, for example an adhesive means, or an anchoring device means. The upper 20 is then attached to the top surface 30 of the midsole 24 along the lower edge of the upper 20. Again such techniques for attachment are well known in the art.

The rubber containing compositions of the present invention preferably comprise one or more of each of the following: rubber, processing and/or extending oils, inorganic additives, stabilizers and preservatives, and phosphorescent (Glow In The Dark ("GID")) compounds. They preferably also comprise modifying polymers, dry blend flow modifiers, and/or reinforcing or extending fillers.

The phosphorescent compounds impart phosphorescence to these compositions and to articles made therefrom. This gives the article it's glowing feature for a period of time (see Table 1 below) following their exposure to light. Such phosphorescence is manifested by a short period of intense glow immediately after exposure of the article to light, followed by a less intense glow that persists for several hours. Upon renewed exposure to light, the material absorbs enough light energy to again demonstrate the glowing quality. The present invention imparts to provide enhanced phosphorescence while maintaining the necessary hardness and abrasion.

TABLE 1

| Glow Test | |
|---|---|
| Length of Light Exposure (300 watt sunlamp, e.g., ASTM D-1148) at a distance of 6 inches | Length of Intense Glow |
| 10 sec. | 10 min. |
| 1 min. | 11 min. |
| 10 min. | 12 min. |
| 30 min. | 12 min. |

Phosphorescence enables the wearers of shoes made from, or having soles made from, the compositions of the present invention to be easily identified at night and avoided by on-coming traffic. Such shoes find particular use by pedestrians and bicyclists. In addition, children are intrigued by the phosphorescence and are inclined to wear phosphorescent and phosphescent soled shoes more than plain shoes and tend to learn how to put them on faster. Further, GID soles enable their owners to locate the shoe more easily in the nighttime to avoid the need to turn on the lights and possibly wake his/her spouse, or to avoid the problem of stubbing a toe while searching for the shoes.

In accordance with the present invention, the phosphorescent material is incorporated throughout the composition. Therefore, it is not removed by abrasion and does not disappear with wear of the shoes. The only interference with the glow that may occur is through a build up of dirt on the phosphorescent part of the sole which, however, can easily be restored with a simple cleaning.

The most preferred phosphorescent compounds suitable for use in this invention are phosphorescent pigments, such as zinc sulfide copper compounds. One such compound is Lumilux® Green supplied by HOECHST branch in Korea. The advantage of using Lumilux Green is that it provides a higher degree of phosphorescence than the phosphorescent pigments used in the prior art.

The rubber material contained in the composition of the present invention provides the elastomeric matrix to which other components are added. Preferably, these polymers are styrenic block copolymers and most preferably butadiene block copolymers. A particularly preferred polystyrene polybutadiene block copolymer is SBR 1502 manufactured by KUM HO Petrochemical Co., Ltd. in Korea. A preferred polybutadiene rubber (BR) is KBR-01, manufactured by KUM HO Petrochemical Co., Ltd. in Korea. Other elastomeric polymers that can be used in accordance with the present invention include but are not limited to EPDM and EPM which enhance the transparency of the final product, and other rubber batching chemicals.

During the conversion of raw synthetic polymers into desired objects, such as shoe soles, various melt-processing procedures are involved, such as extrusion, injection molding, calendaring, blow molding, thermoforming, etc. The inherent viscoelastic properties of each polymer type lead to certain undesirable processing defects, so additives are used to ease these processing-related problems. Heat and light stabilizers, antioxidants, and lubricants are well-defined and well-established additives. Processing aids are another important plastic additive product. Such processing aids can be made of small molecules, oligomers, or high molecular weight polymers.

The processing oil or oils act as viscosity modifiers (plasticizers) of the mixture and facilitate flow and processing. They also act as extenders. Naphthenic hydrocarbon oils, RN-2 and RN-3, are preferred for this purpose, although certain aliphatic oils, RP-1, RP-2 and RP-3, may also be used and are manufactured by MI CHANG Petroleum Ind., Co., Ltd. in Korea.

Modifying polymers are not incorporated into the composition of the present invention. However, modifying polymers can be used without affecting any property of the GID compound, and they usually serve to enhance the melt flow of the composition as well as strength, abrasion resistance, durability and surface finish of the articles made from such compositions. Preferred modifying polymers would be high density polyethylene, ethylene vinylacetate, polybutadiene resins, high styrene resins, poly(alpha-methylstyrene) resin, crystal polystyrene resin, high impact styrene polymers and co-polymers, and mixtures thereof. A particularly preferred mixture would be one containing poly(alpha-methylstyrene), and crystal polystyrene or a high-impact styrene polymer or copolymer (such as a copolymer of styrene and acrylonitrile).

The stabilizers and preservatives incorporated in the present compositions help prevent premature decomposition of the materials during melt-processing (e.g. when making the articles of the present invention), storage, and use. They can include antioxidants, ultraviolet stabilizers, and other stabilizers, preservatives, etc. Any ultraviolet stabilizers must be compatible with the phosphorescent pigment, so that they do not inhibit its light-absorbing ability.

Preferred stabilizers and preservatives are hydroxybenzoate ultraviolet stabilizers, hindered phenolic anti-oxidants, and thioester stabilizers, usually lower alkyl thioesters of carboxylic acids. Particularly preferred as the ultraviolet stabilizer is BIS (2.2, 6.6-tetramethyl-4-piperidiny)sebacate, which is called Tinuvin 770, HALS Sanol LS770i and is manufactured by CIBA-GEIGY Co., Ltd., in Germany. Particularly preferred as the phenolic antioxidant is 2.6-BIS (1.1-dimothyl-ethyl)-4-methylphenol, which is called BHT, manufactured by JIN YANG Chemical Ind. Co., Ltd. in Korea. Preferred would be the thioester stabilizer dilauryl throdipropionate plastic for the plastic batch, but no thioester is used for the GID compound for the shoe outsole. Also preferred as stabilizers are SUNNOC P manufactured by OUCHI SHINKO Chemical Ind. Co., Ltd. in Japan, and Irganox 1010 (antioxidant) 1.3-propanedyl 3.5-BIS (1.1-dimethylethyl)-α-hydroxyxbenene propanoate manufactured by CIBA—GEIGY Co., Ltd. in Switzerland. A combination of an ultraviolet stabilizer, a hindered phenolic anti-oxidant, SUNNOC, and Irganox 1010 is preferred. For the shoe sole compound it is preferable to use the antioxidant BHT for reasons of cost minimization and blooming protection.

Further stabilizers which may be incorporated in the present invention include:

Irganox 245, 259, 565, 1035, 1076, 1098, 3114, and 3125; and

Cyanox 1790, 2246, and 425.

Many other stabilizers not listed here, well-known in the pertinent art, may also be used according to the present invention.

In addition, as a flow modifier known in the art, precipitated finely divided silica is sometimes included to permit easier handling of the mixture during manufacture of the composition by a dry blending process. Polyethylene glycol ("PEG") is mainly used as the flow modifier, but not for the GID composition. In general, 2–3 grams are used for every 100 grams of compound.

Silica and other materials may also be used as fillers. Such fillers typically include limited amounts of sawdust, ground cork, fibrous fillers, such as cellulosic polyester or acrylic fibers. Clay, talc, titanium dioxide, carbon black, calcium carbonate and other pigments commonly used as fillers are not desirable for use in the present invention because they interfere with the intensity of the glow and the length of the afterglow. The content of the present composition in each of the above ingredients is as follows:

polybutadiene rubber: 40–50% by weight; preferably 45.4% by weight;

processing oil: 5–10% by weight; preferably 6.5% by weight;

modifying polymer(s): 0–20% by weight; preferably 0% by weight;

GID: 3–8% by weight; preferably 6.1% by weight;

stabilizer(s): 0–5% by weight; preferably a mixture of stabilizers all within the same weight range;

dry blend flow modifier: 10–30% by weight; preferably 22.7% by weight;

filler: the remainder.

The invention is further described below in particular example, which is intended to illustrate the present invention, but not to limit its scope.

The following ingredients and proportions were used to prepare a phosphorescent rubber compound in accordance with the present invention for use in making shoe soles:

TABLE 2

GID Sole Recipe

| CHEMICAL | GRAM (g) | PERCENT BY WEIGHT |
|---|---|---|
| SMR L (Natural Rubber) | 53 g | 4.86% |
| SBR 1502 (Polystyrene-butadiene block copolymer) | 72 g | 6.60% |
| KBR-01 (Polybutadiene rubber) | 495 g | 45.35% |
| Zeosil (Silica) | 248 g | 22.72% |
| T-AZO (Activated Zinc oxide) | 27 g | 2.47% |
| ST/A (Stearic Acid) | 6 g | 0.55% |
| SUNNOC (Microcrystalline paraffine wax) | 6 g | 0.55% |
| Processing Oil | 71 g | 6.51% |
| M (2-Mercaplobenzothiazole) | 2.5 g | 0.23% |
| DM (2.2-Dithio-bis-benzothiazole) | 8 g | 0.73% |
| TS (Tetramethylthiuram-monosulfide) | 0.9 g | 0.08% |
| S (Sulfur) | 12 g | 1.10% |
| GID (Phosphorescent Pigment) | 67 g | 6.14% |
| SBR 2003 | 23 g | 2.11% |

The following ingredients and proportions were used to prepare a non-phosphorescent rubber compound in accordance with the present invention for use in making shoe soles:

TABLE 3

Regular Sole Recipe

| CHEMICAL | GRAM (g) | PERCENT BY WEIGHT |
|---|---|---|
| SMR L (Natural Rubber) | 87 g | 8.74% |
| NBR 35L (Polyacrylonitrile butadiene rubber) | 87 g | 8.74% |
| KBR-01 (Polybutadiene rubber) | 433 g | 43.50% |
| Zeosil (Silica) | 260 g | 26.12% |
| Processing Oil | 35 g | 3.52% |
| ZnO (Zinc oxide) | 35 g | 3.52% |
| PEG (Polyethylene glycol) | 24 g | 2.41% |
| ST/A (Stearic Acid) | 6 g | 0.60% |
| SUNNOC (Microcrystalline paraffine wax) | 6 g | 0.60% |
| M (2-Mercaplobenzothiazole) | 1.2 g | 0.12% |
| DM (2.2-Dithio-bis-benzothiazole) | 9 g | 0.90% |
| TS (Tetramethylthiuram-monosulfide) | 0.2 g | 0.02% |
| S (Sulfur) | 12 g | 1.21% |

The compositions of the present invention can be made by well-known and by various methods.

In one dry-blending and/or melt-processing techniques, polybutadiene rubber, in powder form, is charged into a Banbary mixer, or other such kneader, and heated mechanically to about 158°–176° F. Processing oil is added and vigorously mixed into a powder at about 158°–176° F. Polymer modifiers are then added and mixed at a low speed to become uniformly distributed within the blend. Addition of stabilizers and colorants then follows. Flow modifiers are added last to convert the blend to free-flowing finely divided powder. The prepared powder is then melt-mixed as follows: The mixture is heated to melt the ingredients (at about 178°–194° F.). In this step, the solid ingredients are preferably mixed with the melting ingredients as thoroughly as possible. The material is then converted to a form that is suitable for further processing, such as extrusion, injection molding, etc.

A method particularly well known in the art to make shoes and shoe soles is to start with rubber or plastic pellets. The process of making the sole usually involves a mold to be used in an injection molding machine. The mold determines the dimensional features of the sole, and the injection molding machine melts the thermoplastic rubber and conveys it as a fluid into the mold.

In one method, clear poly-vinyl-chloride ("PVC") outsoles are fabricated either by injection molding directly attached on to the upper portion of the shoe, or the outsole may be separately fabricated and then cemented to the upper portion of the shoe. When such injection molding techniques are used, typically, pellets of PVC, polyurethane or thermo plastic rubber ("TPR"). In this technique, the pellets are melted, and injection molded to form the outsole.

A particularly preferred method for forming the shoe soles in accordance with the present invention is by molding materials that are processed into sheet form. When the preferred compound (polybutadiene rubber) comes out of the Banbary mixer or kneader, it is heated. What comes out of the mixer or kneader is then rolled into a sheet stock. That rolling is accomplished through the use of two rollers disposed proximate to each other, to form a pressing gap. Typically, said sheet stock may be cut into 18 inch wide by 36 inch long sheets. Said sheets are then die cut into pieces, wherein said pieces are more or less the shape of the outsoles. In effect, the sheets and die cut pieces may be sized to minimize waste, as excess material is preferably discarded. By maximizing the die cut sizes (which correspond to the shoe sizes) versus the sheet sizes, the manufacturing process may be optimized, but typically, about six to ten pairs of outsole pieces may be yielded from a single sheet. Then, the die cut pieces are introduced into a steel, high compression mold. The die cut pieces (which are preferably formed of the rubber compound as set forth herein) are then heated to 284°–293° F. for 8 minutes (dwell time) under pressure. Because the die cut pieces are heated within the high compression mold (wherein the mold provides the appropriate gap which corresponds to the desired thickness of the outsole), the rubber compound melts and flows. This melting process accomplishes many objectives, including that any imprints desired (such as treads, designs, etc.) may be molded into the outsole, the outsole may be molded into precisely the correct size and shape (as the molds are based on standard shoe sizes), the rubber may be cured to enhance durability, hardness, abrasion, and other parameters, as desired, etc. Finally, the molded rubber outsoles are pulled from the molds, and are air cooled. If the molded rubber outsoles are left in the mold too long, the pieces may be over cured, and the desired quality lost. The temperature and dwell time may be varied as desired, but as set forth herein, standard temperature and dwell times for any rubber compression molded outsole are set forth.

The mold design is determined primarily by aesthetic considerations, but strength and durability of the sole, and efficiency of the molding process, molding material, and material used to fabricate the mold are all considerations in designing the mold. Mold making materials are metals and composite materials known in the mold design field. Shoe sole molds are preferably machined from aluminum or cast from aluminum.

TABLE 4

Typical Properties of a Shoe Sole Manufactured in Accordance with the Present Invention

| Property | |
|---|---|
| Tensile Strength | 96 kg/cm$^2$ |
| Elongation Ratio | 668% |
| Tear Strength | 37 kg/cm |
| Hardness | 65 ± 2° A-Type |
| N.B.S. (Abrasion) | 228% |
| Specific Gravity | 1.14 g/cc. |
| Tensile modulus (or 100% modulus) | 17 kg/cm$^2$ |
| 300% modulus | 36 kg/cm$^2$ |

The above invention has been described with reference to particular embodiments. In light of the above description, however, it will be obvious to those of ordinary skill in the art that many modifications, additions, and deletions are possible without departing from the scope or the spirit of the present invention as claimed below.

What is claimed is:

1. A phosphorescent shoe sole made in whole or in part from a composition comprising:
   (a) about 40–50% by weight of a polybutadiene rubber selected from the group consisting of polystyrene butadiene block copolymers suitable for making footwear;
   (b) about 5–10% by weight of a processing oil selected from the group consisting of napthenic hydrocarbon oils suitable for use as polymer plasticizers and extenders and mixtures thereof;
   (c) about 0–5% by weight of a stabilizer selected from the group consisting of ultraviolet stabilizers, antioxidant compounds, thioesters of carboxylic acids, and mixtures thereof; and
   (d) about 3–8% by weight of a phosphorescent compound, wherein said phosphorescent compound gives said composition, and products made therefrom, phosphorescent properties.

2. The shoe sole of claim 1, said composition further comprising:
   (e) about 20–25% by weight of a flow modifier.

3. The shoe sole of claim 2, whereby said polybutadiene rubber is KBR-01.

4. The shoe sole of claim 2, whereby said phosphorescent compound is a zinc sulfide copper compound.

5. The shoe sole of claim 2, whereby said flow modifier is the silica compound Zeosil 45.

6. A phosphorescent shoe sole made in whole or in part from a composition consisting essentially of:
   (a) about 40–50% by weight of a polybutadiene rubber;
   (b) about 5–10% by weight of a processing oil;
   (c) about 0–5% by weight of a stabilizer; and
   (d) about 3–8% by weight of a phosphorescent compound, wherein said phosphorescent compound gives said composition, and products made therefrom, phosphorescent properties.

7. The shoe sole of claim 6, said composition further comprising:
   (e) about 20–25% by weight of a flow modifier.

8. The shoe sole of claim 7, whereby said polybutadiene rubber is KBR-01.

9. The shoe sole of claim 7, whereby said phosphorescent compound is a zinc sulfide copper compound.

10. The shoe sole of claim 7, whereby said flow modifier is the silica compound Zeosil 45.

11. A phosphorescent shoe sole made in whole or in part from a composition preferably consisting essentially of:
    (a) about 45.35% by weight of a polybutadiene rubber;
    (b) about 6.51% by weight of a processing oil;
    (c) about 0.55% by weight of a stabilizer; and
    (d) about 6.14% by weight of a phosphorescent compound, wherein said phosphorescent compound gives said composition, and products made therefrom, phosphorescent properties.

12. The shoe sole of claim 11, said composition further consisting essentially of about 22.7% by weight of a flow modifier.

13. The shoe sole of claim 12, whereby said polybutadiene rubber is KBR-01.

14. The shoe sole of claim 12, whereby the phosphorescent compound is a zinc sulfide copper compound.

15. The shoe sole of claim 12, whereby said flow modifier is the silica compound Zeosil 45.

16. The shoe sole of claim 11, whereby said polybutadiene rubber is KBR-01.

17. The shoe sole of claim 12, whereby the phosphorescent compound is a zinc sulfide copper compound.

18. The shoe sole of claim 12, whereby said flow modifier is the silica compound Zeosil 45.

* * * * *